United States Patent [19]

Illger et al.

[11] 4,288,559
[45] Sep. 8, 1981

[54] FLAME RESISTANT FOAM

[75] Inventors: Hans-Walter Illger, Roesrath; Manfred Dahm, Leverkusen, both of Fed. Rep. of Germany; Alberto C. Gonzalez-Dörner, Polinyá, Spain

[73] Assignee: Bayer Aktiengesellschaft, Leverkusen, Fed. Rep. of Germany

[21] Appl. No.: 90,195

[22] Filed: Nov. 1, 1979

[30] Foreign Application Priority Data

Nov. 16, 1978 [DE] Fed. Rep. of Germany ....... 2849649

[51] Int. Cl.$^3$ ................................................ C08J 9/40
[52] U.S. Cl. ...................................... 521/55; 427/421; 521/67; 521/69; 521/70; 521/114; 521/121; 521/122; 521/123; 521/137
[58] Field of Search ................. 521/137, 122, 123, 55, 521/67, 137, 121, 114

[56] References Cited

U.S. PATENT DOCUMENTS

| | | | |
|---|---|---|---|
| 2,955,056 | 10/1960 | Knox | 521/137 |
| 3,262,894 | 7/1966 | Green | 521/107 |
| 3,883,475 | 5/1975 | Racky | 260/45.7 PE |
| 4,134,875 | 1/1979 | Tapia | 260/42.46 |

FOREIGN PATENT DOCUMENTS

| | | |
|---|---|---|
| 977929 | 12/1964 | United Kingdom . |
| 1359734 | 7/1974 | United Kingdom . |
| 1495721 | 12/1977 | United Kingdom . |
| 1519795 | 8/1978 | United Kingdom . |

*Primary Examiner*—Morton Foelak
*Attorney, Agent, or Firm*—Gene Harsh; Joseph C. Gil; Lyndanne M. Whalen

[57] ABSTRACT

The instant invention is directed to a process for the production of flame resistant foams by the impregnation of polyurethane foams with a dispersion consisting substantially of an aluminum hydroxide, a polyurethane latex, an alumino-silicate and surface active substances which results in foams having very desirable mechanical properties as well as excellent flame resistant properties.

10 Claims, No Drawings

FLAME RESISTANT FOAM

BACKGROUND OF THE INVENTION

Foams based on polyisocyanates, for example, polyurethane, polyisocyanurate and polycarbodiimide foams, are widely known and used. The main methods of producing these foams are the continuous block foaming method and foaming in molds.

There have been many attempts to improve the known properties of these foams. Thus, for example, the incorporation of solid and liquid flame retarding agents during the foaming reaction has been described in the literature for improving the flame resistance of polyurethane foams. These measures, however, can only provide a slight improvement in the flame resistance properties. Since these flame retarding agents are foreign materials which do not, in most cases, take part in the reaction, the resulting foams are often inferior in their mechanical properties compared to foams which have not been flame-proofed. Also, these flame retarding agents are frequently insoluble and have the effect of increasing viscosity. Liquid flame retarding agents affect the foaming reaction due to their basic or acid character. Because of this, they cannot be used in all desired proportions and/or incorporated in every formulation. Solid flame retarding agents can only be foamed with considerable technical difficulty because they must first be made up into a paste and therefore are impossible to deliver from some types of feed apparatus.

For the above reasons and due to their deleterious effect on the mechanical properties of the foams finally obtained, the quantities in which these agents are used in proportion to the other reactants is limited. Furthermore, by far the majority of known flame retarding agents are halogen compounds or halogen-phosphorus compounds. These types of compounds may develop toxic and/or corrosive gases in the event of fire. This does not eliminate the dangers; it only displaces them.

Attempts have also been made to improve the mechanical and flame retarding properties of foams by impregnation. Thus, a process for the impregnation of lightweight foams with solutions of hardenable polyurethanes is described in U.S. Pat. No. 2,955,056. Although the process makes it possible for foams with improved mechanical properties to be produced, it has the serious disadvantage of requiring the use of organic solvents. In many cases, in practice, these solvents are difficult to handle because they are often combustible and/or highly flammable and produce explosive gas mixtures with air. They are many times physiologically harmful also. Furthermore, foams which have been impregnated in this way have the disadvantage that, due to the organic solvent used, they undergo an undesirable initial swelling and after evaporation of the solvent, the foam is often left behind as a shrunken mass with occluded cell structure.

The flame proofing of foams by impregnation with polychloroprene latex containing filler has been described in British Pat. No. 977,929. Disadvantages of this process are the high halogen content of the flame retarding mixture and consequent high density of smoke, the cross-linking with sulphur required to fix the impregnating substance and the fact that the flame-proofing obtained is in many cases insufficient.

According to German Pat. No. 2,031,160, the mechanical properties, lightfastness and flame resistance of open celled foams which have a low unit weight can be improved by impregnating the foams with aqueous dispersions of rigid elastic or flexible polyurethane resins. This patent also describes the use of fillers in general. It has now been found that aluminum hydroxide is a particularly valuable filler, but its use is not described in the above-mentioned German patent.

BRIEF DESCRIPTION OF THE INVENTION

It has now surprisingly been found that the impregnation of polyurethane foams with a dispersion consisting substantially of an aluminum hydroxide, a polyurethane latex, and mixing stabilizers results in foams which have very desirable mechanical properties as well as excellent and unexpected flame resistant properties. The flame resistant effect is all the more surprising since one would have expected that the dilution of aluminum hydroxide with a halogen-free polyurethane latex, which is itself combustible, would severely diminish the flame resistant properties.

The present invention thus relates to a flame resistant foam impregnated with a dispersion consisting of a polyurethane latex, an aluminum hydroxide, surface active substances and an aluminosilicate.

A foam which is preferred according to the invention is characterized in that the foam used for impregnation has a density of from 10 to 100 kg/m$^3$. The quantity of solid taken up by the foam used for impregnation is from 10 to 800%, preferably from 15 to 500% of the original weight of the foam. The impregnated foam contains from 10 to 95% by weight of aluminium hydroxide, based on the total weight of the impregnated foam.

The present invention also relates to a process for the production of a flame resistant foam which is completely impregnated or sprayed with a dispersion consisting of a polyurethane latex, an aluminum hydroxide, surface active substances and an aluminosilicate or in that the dispersion is sucked into the foam by a vacuum means or pressed into the foam by means of a doctor blade.

A preferred process is characterized in that the latices used are of polyurethanes which, in the homogeneous form, have a Shore hardness A of at least 5 and a Pendulum hardness of at the most 240.

A particularly preferred process is characterized in that foams based on isocyanate are used, in particular polyurethane foams.

The process according to the invention has considerable advantages:

(A) Impregnation with the aqueous polyurethane dispersion is carried out at room temperature while curing may be carried out at any elevated temperature, provided that it does not adversely affect the carrier foam.

(B) Since the carrier of the dispersion is water, the curing process is not accompanied by the formation of any combustible or explosive gas mixtures so that the process need not be carried out in apparatus protected against explosion. There is also no physiological risk.

(C) Impregnation does not impair the openness of the cells of the foam.

(D) The polyurethane latex used adheres extremely firmly to the foam without containing reactive groups and without the use of additional fixing agents. The addition of cross-linking agents or curing agents is not essential since the film formed on the surface of the foam is not sticky.

(E) Any fillers introduced become firmly anchored by the tough elastic envelope formed by the polyurethane from the dispersion. No dust is formed even when the foam is subjected to mechanical vibration.

(F) Due to their more or less pronounced electrolyte sensitivity, the preferred cationic or anionic aqueous polyurethane dispersions used can be precipitated in the foam in a controlled manner by coagulation during the impregnation process without causing any occlusion of the cells. This variation of the impregnating process makes it possible for a large proportion of the latex serum to be squeezed out mechanically during the process of impregnation, thus providing a technically simple method of modifying the foam as well as making it possible for a considerable quantity of heat to be saved, heat which would otherwise be required for evaporation of the water.

(G) It is surprisingly found that the process according to the invention enables lightfast, open-celled foams to be produced from light sensitive, yellowing cellular substrates. It is preferred to use polyurethane dispersions which have been prepared from aliphatic, cycloaliphatic or araliphatic polyisocyanates, e.g., preferably hexamethylene diisocyanate, trimethylhexamethylene diisocyanate, diisocyanatomethyl cyclobutane or isophorone diisocyanate.

(H) When applied to polyurethane flakes or polyurethane foam waste, the process according to the invention carried out simultaneously with shaping at moderate or high pressures, can be used for the production of cellular molded articles, flat products or elastic or semirigid to rigid articles of various geometrical foams.

(I) The hydrophilic and hydrophobic character of the foams can be adjusted as desired by the structure of the dispersed polyurethane, in particular the ionic group content.

(J) The formulation for producing the foams need not be altered for the flame proofing and, in particular, there is no impairment of the mechanical properties of the foam by the addition of flame retarding agents.

(K) Flame proofing can be controlled so that it is applied to the areas at greatest risk, e.g., to the surface or certain parts of the surface (it is well known that even so-called combustible foams are in many cases still subject to unacceptable powerful, even if only brief surface burning).

(L) It is surprisingly found that dispersions having only a minimal halogen content provide exceptionally effective flame proofing with very low smoke density values.

(M) Due to their excellent adherence, the preferred ionomeric polyurethane latices, when used for impregnation, may also serve as excellent fixatives and bonding agents for other additives such as pigments, dyes, graphite, carbon black, titanium dioxide, biocidal and bactericidal compounds, deodorants, anti-blood coagulants and various metal powders such as aluminum, copper, iron, zinc or manganese.

The polyurethane dispersions which are suitable for the process according to the invention are known.

Examples of the preparation of aqueous polyurethane dispersions may be found in German Auslegeschriften Nos. 1,097,678; 1,187,012; 1,184,946; 1,178,586 and 1,179,363; German Offenlegungsschriften Nos. 1,770,068; 1,939,911; and 1,943,975; Belgian Pat. Nos. 653,223; 658,026; 669,954; 673,432; 727,923; and 688,299; British Pat. No. 883,568; French Pat. Nos. 1,108,785; and 1,410,546; and U.S. Pat. Nos. 3,178,310; and 3,410,817.

Particularly suitable for the process according to the invention are those dispersions which have been prepared without the use of emulsifiers. The emulsifier-free dispersions of polyurethane ionomers being particularly preferred, especially those of anionic polyurethanes, e.g., those containing sulphonate or carboxylate groups, or of cationic polyurethanes, e.g., those containing quaternary ammonium groups.

The preparation of cationic polyurethane dispersions has been described, for example, in German Offenlegungsschriften Nos. 1,595,602 and 1,495,693 and German Auslegeschrift No. 1,300,275.

The preparation of anionic polyurethane dispersions has been disclosed, for example, in German Offenlegungsschriften Nos. 1,495,745; 1,544,892 and 2,035,732.

According to the invention, it is preferred, for the purposes of increasing the light fastness, to use dispersions of polyurethane ionomers which have been prepared from hexamethylene diisocyanate, isophorone diisocyanate and/or m- and xylyene- diisocyanate.

It is not essential that an organic solvent is present when the polyurethane is mixed with water to form a dispersion. If the polyurethane mass is stirrable or can be processed mechanically in some other way at the time of its being mixed with water at the operating temperatures, the presence of a solvent may be largely or even completely dispensed with. According to one particularly preferred and extremely economical process, polyurethane dispersions are prepared solvent-free by the polycondensation of oligourethane electrolytes which have reactive end groups with formaldehyde donors in an aqueous diphasic system. In this process, the oligourethane electrolyte, which may contain methylol groups, is preferably dispersed in the form of the solvent-free melt simply by mixing it with water. This process, which can be used for preparing dispersions which are suitable for the purpose of the invention, has been described in detail in Belgian Pat. No. 730,543. According to a particularly preferred method, oligourethane prepolymers containing isocyanate end groups (about 0.8 to 10% NCO) are reacted with urea or some other aminoplast compound and the resulting prepolymers, which are at least bifunctional in their reaction with formaldehyde, are ionically modified by one of the methods known in the literature or described above and then dispersed by mixing with water. Formaldehyde or formaldehyde donors are added before, during or after the process of dispersion.

Polycondensation to the high molecular polyurethane is generally carried out, at least partly, in the dispersion by thermal after-treatment and/or lowering of the pH. Dispersions of aluminum hydroxide in polyurethane dispersions which have been precondensed in this way are then used for impregnating the foams. Alternatively, polycondensation may be carried out on the substrate or after drying, by the action of heat or by storage at room temperature.

Cationic dispersions in which the solid substance contains more than 5%, preferably 7 to 20%, of nitrogen are particularly preferred. For the production of ionic groups, it is particularly advantageous to use a proportion of phosphoric acid as salt former.

Any flexible foams are generally suitable for the process according to the invention, for example, flexible polyvinyl chloride foams, latex foams and natural sponges. Isocyanate-based foams, in particular, polyurethane foams, are particularly suitable.

The polyurethane foams have long been produced on a commercial scale by the well-known isocyanate polyaddition process from compounds containing several active hydrogen atoms, in particular, compounds containing hydroxyl and/or carboxyl groups and polyisocyanates, to which water activators, emulsifiers, foam stabilizers and other additives may be added (R. Vieweg, A. Hochtlen, *Kunststoff-Handbuch*, Vol. VII, Polyurethane, publishers; Hanser-Verlag Munich, 1966).

Polyurethane, polyisocyanurate and polycarbodiimide foams are preferably produced by mixing the liquid components. The starting materials which are to be reacted together are either all mixed together at the same time or a prepolymer containing isocyanate groups is first prepared from a polyhydroxyl compound such as polyethylene glycol ethers or polyesters containing hydroxyl groups with an excess of polyisocyanate, and this prepolymer is then converted into the foam with water in a second operation.

The starting materials for the isocyanate-based foams to be used according to the invention have been described, e.g., in *High Polymers*, Volume XVI, *Polyurethanes, Chemistry, and Technology* by Saunders-Frisch, Interscience Publishers, New York, London, Part 1, 1962, pages 32 to 42 and pages 44 to 54 and part II, 1964, pages 5 to 6 and 198–199 and in *Kunststoff-Handbuch*, Volume VII, Vieweg-Hochtlen, Carl Hanser Verlag, Munich 1966, e.g. on pages 45 to 71.

Examples of any catalysts, surface active additives, foam stabilizers, cell regulators, reaction retarders, stabilizers, flame retarding substances, plasticizers, dyes, fillers and fungistatic and bacteriostatic substances which may be used in the production of the foams and details concerning the use and action of these additives are described in *Kunststoff*-Handbuch, Volume VII, published by Vieweg and Hochtlen, Carl Hanser Verlag, Munich 1966, e.g., on pages 103 to 113.

The components are reacted together by the known oneshot process, prepolymer process or semi-prepolymer process, in many cases using mechanical devices, e.g., those described in U.S. Pat. No. 2,764,565. Details concerning processing apparatus which may also be used for the purpose of the invention may be found in *Kunststoff-Handbuch*, Volume VII, published by Vieweg and Hochtlen, Carl Hanser Verlag, Munich 1966, e.g., pages 121 to 205.

The (aqueous) dispersion (or suspension) used according to the invention for impregnating the foam has a solids content of from 25 to 80% by weight, preferably from 35 to 65% by weight. The composition of the dispersion depends to a large extent on the desired flame protection. In addition to the polyurethane latex component, of the dispersions, wherein the solids content, (based on the weight of the total dispersion) of said latex component is from 1 to 20% by weight, preferably from 2 to 15% by weight, aluminum hydroxide, preferably with the usual particle sizes of the commercial products, (e.g., $<100/\mu$), and the usual water content, for example 35% by weight, is used in concentration of from 15 to 75% by weight, based on the aqueous dispersion, preferably concentrations of from 30 to 60% by weight. Furthermore, the dispersion contains from 0.1 to 5% by weight of an aluminosilicate, such as bentonite. The alumino silicates used according to this invention are known in the art and generally commercial available.

To facilitate incorporation of the aluminum hydroxide and to keep dispersion stable in storage, from 1 to 20% by weight, based on the aqueous dispersion, of suitable surface active substances such as ethoxylated alkyl phenols and/or sulphonated wetting agents such as alkyl sulphonates are generally added. Silicone emulsions may also be added to prevent excessive foaming.

In addition to aluminum hydroxide, other flame retarding compounds and/or compounds which promote carbonization may be added in quantities of from 0.1 to 30% by weight, e.g., starch, dicyandiamide, halogenated hydrocarbons and/or halogen-phosphorus compounds and/or phosphorus compounds such as pentabromotoluene and antimony trioxide. Apart from the constituents so far mentioned, the dispersion may contain other additives, e.g., pigments or age resistors. The components of the dispersion must, of course, all be compatible with each other and must not impair each other in their action.

The quantity of dispersion with which the foam to be impregnated is treated depends mainly on the flame protection desired. The foam is generally treated with a quantity of dispersion such that the solids content taken up amounts to 10 to 800%, preferably 15 to 500%, of the original weight of the foam.

The process according to the invention is simple to carry out. The open celled, flexible foam or sponge is loaded with the dispersion described above, for example, by compression followed by release, and the excess quantity is squeezed off and the impregnated foam is then hardened at room temperature or temperatures above room temperature preferably above 100° C. The curing time depends on the curing temperature, being shorter the higher the temperature. Impregnation may also be carried out as a continuous process, in which case the foam is squeezed by rollers in the dispersion described above and the excess dispersion is then squeezed off outside the solution, again with rollers. The impregnated foam is then passed through an oven for curing. The quantity of dispersion described above deposited in and on the foam structure may be increased both in the batch wise and in the continuous process by repeated compression and relaxation in the dispersion.

According to a further variation of the process, impregnation is carried out simultaneously with shaping, optionally using foam flakes, and shaping and bonding are carried out at normal or elevated pressure to produce elastic or rigid molded products or flat goods. This method may also be used for the continuous production of cylindrical highly elastic rolls.

The impregnating dispersion may be applied to the foam not only by immersion but also by spraying. This method has the advantage that in molded articles, for example, zones with different degrees of flame proofing can be obtained by localized treatment. Another advantage of the spray process is that even articles with complicated contours produced from flexible foam sheets can be flame proofed by the process according to the invention. Finished molded articles may advantageously be flame proofed in this way.

The sprayed foam parts may be treated with compressed air or passed through pairs of rollers in order to ensure deeper penetration of the dispersion. The dispersion may also be applied in depth by blade coating or sucked in by a vacuum treatment.

The foams produced by the process according to the invention are suitable for all fields of application in which flame retardant flexible or semi-rigid foams have previously been used, such as the manufacture of padding or cushion elements, mattresses, heat insulation, sound insulation, textile coating, packaging and structural elements. The new foams may, of course, also be further processed by molding, pressing or welding after they have been manufactured, or they may be lacquered or coated with solutions or dispersions of air drying lacquers based, e.g., on polyisocyanates and polyhydroxyl compounds.

The examples which follow serve to explain the invention in more detail without limiting it in any way.

EXAMPLE

A polyurethane foam was impregnated according to the invention with the following dispersion:

| | |
|---|---|
| Aluminum hydroxide | 140 parts by weight |
| polyurethane latex (40% aqueous anionic polyurethane dispersion based on a polyester and hexamethylene diisocyanate, prepared according to German Offenlegungsschrift No. 2,035,732) | 37.5 parts by weight |
| Water | 112.5 parts by weight |
| Aluminosilicate (Bentone ® LT, trade product of Kronos Titan) | 1.1 parts by weight |
| Chloroparaffin, 55% in water (Arubren ®, trade product of Bayer AG) | 2.0 parts by weight |
| Polyglycol ether (in water) | 5.0 parts by weight |
| Sodium salt of an alkane sulphonic acid, 30% in water (Sulfopon ® 102, trade product of Henkel) | 5.0 parts by weight |
| Reaction product of nonylphenol with 9 mol ethylene oxide as defoaming agent, 20% in water (Lavoral ® 150, trade product of Stockhausen) | 0.3 parts by weight |
| Black pigment | 0.5 parts by weight |

After impregnation, the foam was dried for 45 minutes at about 120° C. Table I shows the mechanical properties, also in comparison with those of untreated foam, and Table II shows the fire characteristics.

TABLE 1

Physical properties

| | Unimpregnated | Impregnated foam | | |
|---|---|---|---|---|
| | Comparison | Not Aged | After Ford aging (5 days, 90° C., 99% r.h.) | After aging in autoclave (5 hrs., 120° C., 99% r.h.) |
| density (kg/m³) | 17 | 84 | | |
| Tensile strength (kPa) | 75 | 137 | 124 | 126 |
| Elongation at break (%) | 135 | 168 | 224 | 186 |
| Compression load deflection (kPa) | 1.8 | 9.4 | 6.2 | 8.1 | r.h. = relative humidity of surrounding atmosphere.

TABLE II

Brand shaft test (Brandschachttest DIN 4102)
Classification B 1, if the thickness of a test sample containing 44% does not exceed 15 mm (density of unimpregnated foam: 20kg/m³).
French epiradiateur test
at 200% application: M 2
at 400% application: M 1
at 400% application after Ford aging or autoclave aging: M 1 (For practical experimental reasons, the thickness of the test sample in the last case was less than a standard sample)
Measurement of smoke density in NBS chamber maximum specific smoke density ($D_m$)

| Without ignition flame (smoldering condition) | With ignition flame (flaming condition) | Impregnated foam (d = 13 mm) |
|---|---|---|
| 74 | 79 | not aged |
| 69 | 55 | after Ford aging |
| 68 | 78 | after autoclave aging |
| 147 | 86 | unimpregnated foam (d = 13 mm) |

What is claimed is:

1. A flame resistant foam-impregnated with a dispersion comprising:
    (a) a polyurethane latex;
    (b) an aluminum hydroxide;
    (c) an aluminosilicate and
    (d) surface active substances.

2. A flame resistant foam of claim 1, wherein
    (a) the foam used for impregnation has a density of from 10 to 100 kg/m³;
    (b) the impregnated foam has an uptake of solids content of from 10% to 800%, preferably of from 15% to 500% of the original weight of the foam; and
contains from 10% to 95% by weight of aluminum hydroxide, based on the total weight.

3. A flame resistant foam as claimed in claim 1, wherein said dispersion has a solids content of from 25 to 80% by weight.

4. A flame resistant foam as claimed in claim 1, wherein said dispersion has a solids content of from 35 to 65% by weight.

5. A flame resistant foam as claimed in claim 1, wherein said polyurethane latex component of said dispersion has a solids content of from 1 to 20% by weight based on the weight of said dispersion.

6. A flame resistant foam as claimed in claim 1, wherein said polyurethane latex component of said dispersion has a solids content of from 2 to 15% by weight based on the weight of said dispersion.

7. A flame resistant foam as claimed in claim 1, wherein said aluminum hydroxide component of said dispersion has a particle size of $<100\mu$ and a water content of up to about 35% by weight.

8. A flame resistant foam as claimed in claim 1, wherein said aluminum hydroxide component of said dispersion is used in amounts of from 15 to 75% by weight based on said dispersion's weight.

9. A flame resistant foam as claimed in claim 1, wherein said aluminum hydroxide component of said dispersion is used in amounts of from 30 to 60% by weight based on said dispersion's weight.

10. A flame resistant foam as claimed in claim 1, wherein said aluminosilicate is used in amounts of from 0.1 to 5% by weight based on said dispersion's weight and the surface active substances such as ethoxylated alkyl phenols and/or sulphonated wetting agents such as alkyl sulphonates of said dispersion are used in amounts of from 1 to 20% by weight, based on said dispersion's weight.

* * * * *